United States Patent
Verma et al.

(10) Patent No.: US 12,511,345 B2
(45) Date of Patent: Dec. 30, 2025

(54) TRAINING AND IMPLEMENTING A STEADY STATE LOG ANALYZER

(71) Applicant: Microsoft Technology Licensing, LLC, Redmond, WA (US)

(72) Inventors: Mohit Verma, Seattle, WA (US); Ananth Geethanath, Bothell, WA (US); Rakesh Namineni, Sammamish, WA (US); Ali Alam, Seattle, WA (US); Kamaljit Singh Bath, Redmond, WA (US); Ramanathan Muthiah, Bellevue, WA (US); Suneel Suresh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 570 days.

(21) Appl. No.: 18/085,300

(22) Filed: Dec. 20, 2022

(65) Prior Publication Data

US 2024/0202279 A1 Jun. 20, 2024

(51) Int. Cl.
*G06F 17/40* (2006.01)
*G06F 17/16* (2006.01)
*G06F 18/2137* (2023.01)
*G06F 18/2433* (2023.01)

(52) U.S. Cl.
CPC .............. *G06F 17/40* (2013.01); *G06F 17/16* (2013.01); *G06F 18/2137* (2023.01); *G06F 18/2433* (2023.01)

(58) Field of Classification Search
CPC ...... G06F 17/16; G06F 17/40; G06F 18/2433; G06F 18/2137
See application file for complete search history.

(56) References Cited

U.S. PATENT DOCUMENTS

| 7,213,176 B2 * | 5/2007 | Banko ................ G06F 11/0706 714/38.12 |
| 9,552,249 B1 * | 1/2017 | James ................ G06F 11/0793 |
| 10,210,162 B1 * | 2/2019 | Rees .................... G06F 3/0604 |
| 2020/0184355 A1 | 6/2020 | Mehta |

(Continued)

FOREIGN PATENT DOCUMENTS

CN 113868006 A 12/2021

OTHER PUBLICATIONS

International Search Report and Written Opinion received for PCT Application No. PCT/US2023/036214, Mar. 26, 2024, 15 pages.

(Continued)

*Primary Examiner* — Elias Desta
(74) *Attorney, Agent, or Firm* — Ray Quinney & Nebeker P.C.; James S. Bullough

(57) ABSTRACT

The present disclosure relates to methods, systems, and computer readable media for analyzing log files for a wide variety of services (e.g., cloud computing services or microservices) to determine whether the services are operating as designed over some period of time associated with the log file(s). The present disclosure includes features and functionality for training or otherwise generating a model being configured to predict whether portions of an input log file include data reflective of normal operations of a corresponding service used to generate the input log file. The present disclosure provides a domain-agnostic approach to training an outlier detection model to analyze log files for a wide variety of services.

20 Claims, 7 Drawing Sheets

(56) References Cited

U.S. PATENT DOCUMENTS

Figure 1:
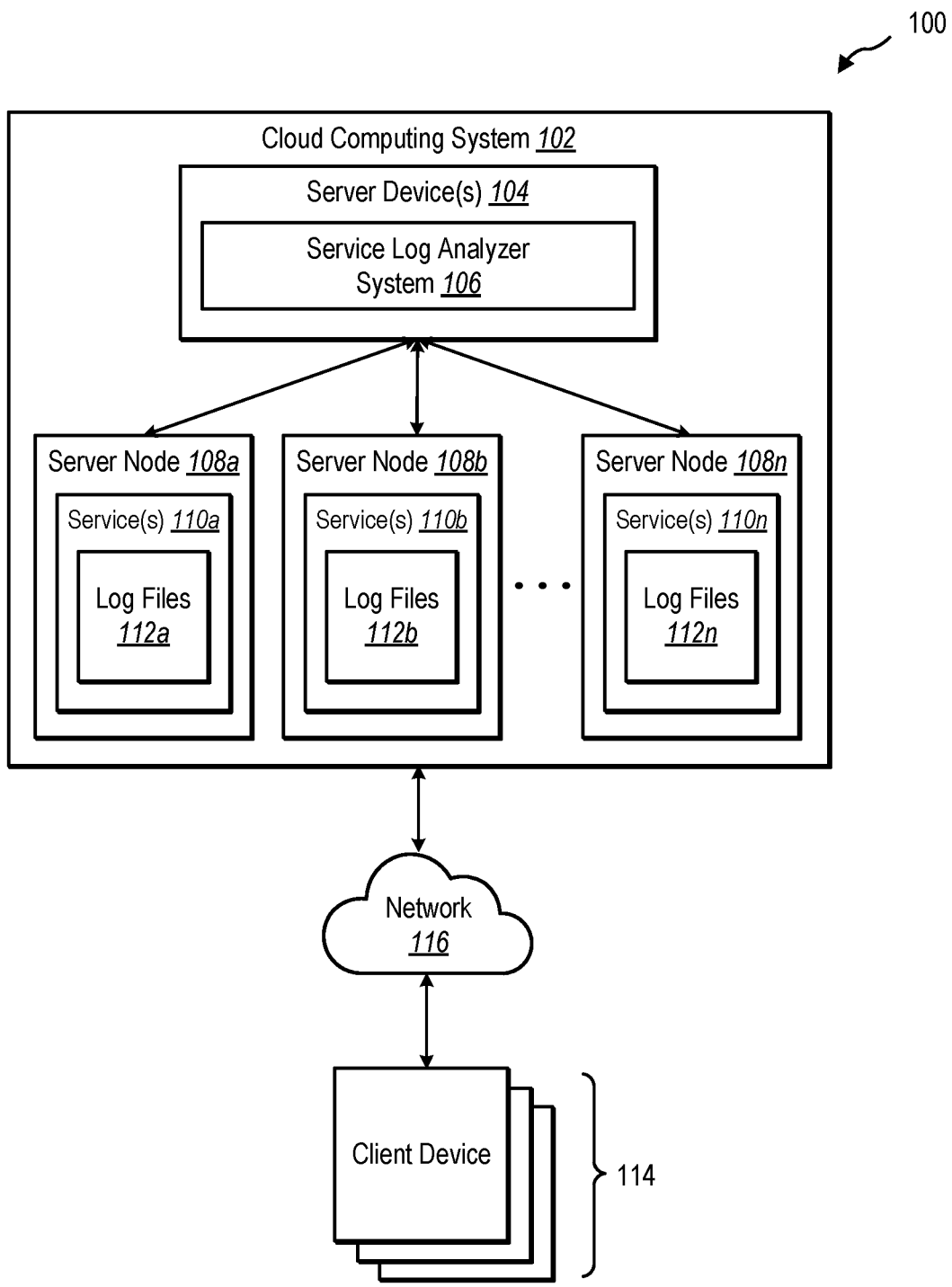

2022/0172067 A1 6/2022 Kang et al.
2022/0245013 A1 8/2022 Ciabarra, Jr. et al.

OTHER PUBLICATIONS

"Autoencoder", Retrieved from: https://en.wikipedia.org/wiki/Autoencoder, Nov. 5, 2022, 14 Pages.
"DeepLog: Anomaly detection and diagnosis from system logs through deep learning", Retrieved From: https://pypi.org/project/deeplog/, Jul. 8, 2022, 5 Pages.
"Source code for pyod.models.hbos", Retrieved From: https://pyod.readthedocs.io/en/latest/_modules/pyod/models/hbos.html, Dec. 1, 2022, 8 Pages.
Capaldi, et al., "Using the sample maximum to estimate the parameters of the underlying distribution", Retrieved From: https://www.ncbi.nlm.nih.gov/pmc/articles/PMC6483189/, Apr. 25, 2019, 13 Pages.
International Preliminary Report on Patentability (Chapter I) received for PCT Application No. PCT/US2023/036214, mailed on Jul. 3, 2025, 9 pages.

\* cited by examiner

TRAINING AND IMPLEMENTING A STEADY STATE LOG ANALYZER

BACKGROUND

Recent years have seen a significant increase in the use of computing devices to create, store, analyze, and present data from various sources. Indeed, tools and applications for collecting, analyzing, classifying, and presenting data are becoming more common and more complex. Moreover, as cloud computing environments provide increasingly diverse and robust services to an increasing number of users, analyzing and presenting data associated with performance of the various services has become an important part of ensuring that services and applications continue to perform as configured in a reliable and predictable manner.

Analyzing and diagnosing problems with a wide variety of services, however, suffers from a number of drawbacks and shortcomings. For example, conventional approaches to analyzing and diagnosing issues in cloud computing services often involve providing log files to domain experts who have domain-specific knowledge for a particular service and who manually read and attempt to diagnose issues within individual log files. Where log files are often thousands of lines long, this can become a very time-consuming and difficult process, even where an individual has a high level of knowledge for a particular service. Moreover, identifying and mitigating problems in a service based on this process often involves large amounts of trial and error as certain issues that are identified in a particular log file are often not the primary cause of significant service interruptions.

These and other problems exist in connection with evaluating and diagnosing problems that exist in log files for a variety of services (e.g., cloud-based services).

BRIEF DESCRIPTION OF THE DRAWINGS

FIG. 1 illustrates an example environment including a service log analyzer system implemented on a server device of a cloud computing system in accordance with one or more embodiments.

FIG. 2 illustrates an example implementation of the service log analyzer system in which a log file is analyzed to identify predicted outliers.

FIG. 3 illustrates an example workflow showing an implementation of the service log analyzer system in training an outlier detection model to predict lines of a log file that are outliers from normal operation of an associated service.

FIG. 4 illustrates an example implementation of a trained outlier detection model for predicting outliers within a log file in accordance with one or more embodiments.

FIG. 5 illustrates another example implementation of the outlier detection model for predicting and presenting outliers in accordance with one or more embodiments.

FIG. 6 illustrates an example series of acts for transforming a log file and applying the outlier detection model to the log file to predict outliers from normal operation of a service.

FIG. 7 illustrates certain components that may be included within a computer system.

DETAILED DESCRIPTION

The present disclosure relates to systems and techniques for analyzing log files for a wide variety of services (e.g., cloud computing services or microservices) to determine whether the services are operating as designed (e.g., in a normal or predicable manner) over a period of time associated with a corresponding log file. For example, the present disclosure describes features and functionalities for training, creating, or otherwise generating a model being configured (e.g., trained) to predict whether portions of a log file correspond to performance of a service that falls in or out of a normal range of expected behavior for the service. Indeed, one or more embodiments described herein involve domain-agnostic training of an outlier detection model that can be performed with respect to a wide variety of services, and which can be used with minimal supervision to determine whether a particular service is operating within a network as designed.

As an illustrative example, and as will be discussed in further detail below, a service log analyzer system identifies a log file for a service on a cloud computing system reflective of normal operation or performance of the service over a period of time. The service log analyzer system applies an encoding model to the log file to generate a multi-dimensional representation in which lines of the log file are represented as points that are plotted within a multi-dimensional space. The service log analyzer system generates an outlier detection model trained to determine outlier scores for individual or groupings of lines of an input log file in which the outlier scores indicate a probability that a given line (or grouping of lines) associated with the score(s) is an outlier from normal performance or execution of the service. The service log analyzer system applies the trained model to a new log file (e.g., an input log file) of the service to determine which portions (e.g., lines) of the new log file correspond to non-normal behavior of the service.

The present disclosure provides a number of practical applications that provide benefits and/or solve problems associated with analyzing and predicting outlier behavior of a service (e.g., a cloud computing service) over some period of time. By way of example and not limitation, some of these benefits will be discussed in further detail below.

For example, the systems described herein provide an automated approach that follows a series of acts that can be performed using unique encoding and training abilities of computing devices. This automated approach to analyzing log files provides a notable improvement over conventional approaches in which an administrator, developer, client, or other individual would manually read through a log file and attempt to identify problems. This is particularly beneficial where log files have thousands of lines that an individual would have to manually read through to identify areas in which a particular service is performing in a non-normal manner.

In one or more embodiments described herein, a service log analyzer system trains an outlier detection model using a domain neutral approach. By training the outlier detection model using a similar domain neutral approach for all types of services, the service log analyzer system provides a framework capable of training an outlier detection model to predict outliers within log files generated by a wide variety of services. Because the training approach is domain neutral, the outlier detection model may be trained using a same approach across different types of services that exhibit different types of behaviors. This is an improvement over conventional approaches, which often require specialized detectors to be individually trained for each corresponding type of service. This individual training of specialized detectors often involves different training approaches at different rates of success resulting in a robust and non-scalable approach to training models in a way that is simply unrealistic for modern cloud computing systems that include hundreds and thousands of types of services. This is also an improvement over conventional manual approaches, which often require that an individual having specific domain knowledge examine a log file for the service on which they are a unique expert.

In addition to providing a domain agnostic approach to training an outlier detection model with respect to a variety of services that exhibit different behaviors, features of the service log analyzer system described herein further provide a dynamic approach that enables the outlier detection model to evolve over time based on different observed service behaviors. Indeed, as cloud computing systems grow in size and complexity, and as logs of a service change over time as a result of changing computing environments, service log analyzer system can adapt to these changing environments and conditions by dynamically retraining or further refining an outlier detection model. This can be done through retraining or reconfiguring the outlier detection model with relatively little supervision by continuously learning from observed steady state log files and keeping the outlier detection model for a given service fresh and accurate with respect to more current service activity.

In one or more embodiments described herein, the service log analyzer system provides a simplified approach to analyzing and identifying outliers (e.g., instances of non-normal service performance or behavior) by generating a multi-dimensional representation of a log file that has a lower dimensionality than the number of rows and/or columns of the log file. By reducing the dimensionality, the interpretability of the outliers as well as the processing expense of applying the outlier detection model to a given log file is greatly improved over more complex models that attempt to interpret much more complex inputs. In one or more embodiments described herein, the service log analyzer system generates a two-dimensional (2D) representation of a steady state log file (e.g., a log file indicated as being associated with normal performance) to be compared against a 2D representation of an input log file associated with an unknown performance of the service. As will be discussed below, this reduced dimensionality representation of the log file provides simplicity and interpretability of the output of the outlier detection model(s) described herein.

The service log analyzer system provides a number of additional benefits. For example, in one or more embodiments, an outlier detection model is refined over time based on additional data obtained with respect to any number of log files. The outlier detection model can further be trained using very minimal supervision, such as based on a single input indicating that a log file is a steady state log file corresponding to normal performance of the service over some period of time. In addition, the service log analyzer system may implement one or more features to reduce noise caused due to normal errors that do not necessarily reflect non-normal performance of the service(s).

As illustrated in the foregoing discussion, the present disclosure utilizes a variety of terms to described features and advantages of one or more embodiments of the service log analyzer system. Additional detail will now be provided regarding the meaning of some of these terms. Further terms will also be discussed in detail in connection with one or more embodiments and specific examples below.

In an example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. The cloud computing system may refer to a private or public cloud computing system.

In an example, as used herein, a "service on the cloud computing system," "cloud computing service," or simply "service" or "microservice" refers to any application, functionality, or grouping of applications and functionalities that are hosted or otherwise enabled by one or more computing devices within a framework of a connected network of devices. Indeed, in one or more embodiments, a service refers to any type of service for which a log file is generated or otherwise maintained for the respective service(s). One or more embodiments described herein refer to microservices or groupings of microservices that are hosted by server nodes on a cloud computing system. As used herein, a service or microservice, may refer to any function or groupings of functions hosted by a computing device in accordance with one or more embodiments.

In an example, as used herein, a "log file" refers to a data object including a record of events that occur with respect to a service running on a computing device. A log file may include a combination of alphanumeric symbols that provide information associated with events that the service is configured to detect or recognize and include within a log file in response to observe the specific event. In one or more embodiments, a log file is constrained by row and column dimensions. In one or more embodiments, a log file includes data representative of an observed operation of the service over a discrete (e.g., predetermined) period of time. In one or more embodiments, the log file is generated and/or maintained by an agent that runs on or concurrent with the service.

In an example, as used herein, "normal operation" or "normal performance" of a service refers to an observed behavior of a service that is indicated as normal or expected behavior by the service. Normal operation or performance of a service may include any number of errors so long as those errors fall within a normal range of operation by the service. In one or more embodiments, normal performance over a period of time is defined as a duration of time during which less than a threshold number of deviations or errors are observed by the service. In one or more embodiments, an operation or performance of a service over a period of time is defined as normal if an administrator, developer, user, or other individual provides an indication that the service operated at an acceptable or otherwise expected level of performance for the service.

In an example, as used herein, a "model" refers to an algorithm, a machine learning model, or set of instructions configured to be applied to data to generate an output in accordance with a configuration of the respective model. For example, in one or more embodiments, an encoding model refers to a program or set of instructions that can be applied to a log file to generate a multi-dimensional representation of the log file. In another example, an "outlier detection model" refers to a steady state representation (e.g., a histogram), an algorithm, and/or machine learning model capable of providing a prediction of whether one or more lines of an input log file fall outside a normal operation of an associated service. As an example, in one or more embodiments, an outlier detection model includes an identified region of a multi-dimensional space within which points representative of lines of a log file are predicted to be associated with normal service operation.

Additional detail will now be provided regarding a service log analyzer system in accordance with one or more example implementations. For example, FIG. 1 illustrates a block diagram showing an environment 100 having a network of computing devices on which services can be hosted and where log files of the services may be analyzed to determine which portions of the log files correspond to normal and non-normal performance of the respective services. As shown in FIG. 1, the environment 100 includes a cloud computing system 102 including service devices operating thereon. As further shown, the cloud computing system 102 includes one or more server device(s) 104 on which a service log analyzer system 106 is implemented to perform features and functionalities described herein.

As shown in FIG. 1, the cloud computing system 102 includes a plurality of server nodes 108a-n. The server nodes 108a-n may host a variety of services 110a-n via the cloud computing platform. Each of the server nodes 108a-n include one or more compute cores, which may be used to host virtual machines, containers, and/or a wide variety of services (e.g., services 110a-n) to be used by internal or external clients (e.g., client devices 114) having access to the cloud computing system 102. By way of example, a first server node 108a hosts a first one or more service(s) 110a. One or more of the services 110a on the first server node 108a may be different from one or more additional services provided by the first server node 108a. For example, the first service node 108a may host a first service, second service, etc. of same or different service types. As shown in FIG. 1, the additional server nodes 108b-n host one or more services 110b-n thereon, which may refer to the same type or different type(s) of services hosted by the first server node 108a.

As further shown in FIG. 1, the services 110a-n have log files 112a-n associated therewith. In one or more embodiments, the services 110a-n generate respective log files 112a-n including data representative of events and other performance telemetry observed for the associated services 110a-n. In one or more embodiments, each of the services 110a-n generate log files 112a-n representative of performance of the services 110a-n over various periods of time. For example, as indicated above, a log file may include any data reflective of events or performance detected by the service over a defined period of time or over some defined number of observed events.

In one or more embodiments, an agent on the server nodes 108a-n monitors performance of the services 110a-n and generates the log files 112a-n. In one or more embodiments, the log files 112a-n are generated by an agent implemented on each of the respective services 110a-n. In one or more embodiments, the log files 112a-n are generating or otherwise maintained by an operating system (OS) of the server nodes 108a-n (e.g., host OSs) or by OSs of the respective services (e.g., VM guest OSs).

As shown in FIG. 1, the environment includes a plurality of client devices 114 in communication with the cloud computing system 102 via a network 116. In some examples, the client devices 114 refer to various types of computing devices including, by way of example, mobile devices, desktop computers, server devices, internet of things (IoT) devices, or other types of computing devices. The network 116 may include one or multiple networks that use one or more communication platforms or technologies for transmitting data. For example, in one or more embodiments, the network 116 includes the Internet or other data link that enables transport of electronic data between respective client devices 114 and devices implemented within the framework of the cloud computing system 102.

As will be discussed in further detail below, the service log analyzer system 106 performs features and functionality related to analyzing and diagnosing services 110a-n on a collection of server nodes 108a-n based on a number of operations described herein performed on the log files 112a-n. Indeed, as will be discussed below, the service log analyzer system 106 may train an outlier detection model to selectively identify portions of log files 112a-n associated with predicted non-normal behavior of the services 110a-n. The service log analyzer system 106 may additionally apply the outlier detection model to any log file associated with the corresponding service to determine whether the service associated with the outlier detection model is behaving as designed or predicted.

In particular, in one or more embodiments, the service log analyzer system 106 receives, identifies, or otherwise obtains the log files 112a-n for analysis and determination of which portions of the log files 112a-n correspond to abnormal, outlier, or otherwise non-normal behavior by the respective services 110a-n. More specifically, the service log analyzer system 106 obtains log files 112a-n that are indicated as being associated with normal behavior of the services 110a-n for training purposes. Indeed, as just mentioned above, in one or more embodiments, the service log analyzer system 106 trains an outlier detection model to predict whether a given log file is representative of a steady state of operation for the associated service. The service log analyzer system 106 may then apply the outlier detection model to another log file of the associated service to determine if the service is behaving in a normal or otherwise predictable manner (e.g., in a similar manner as the service behaved when producing the log file used in generating the outlier detection model).

Additional detail will now be discussed in connection with an example environment 200 showing the service log analyzer system 106 in communication with an example server node 202 having an example microservice 204 implemented thereon. The service log analyzer system 106 may share similar features and functionality as the service log analyzer system 106 discussed above in connection with the example environment 100 discussed above in FIG. 1. In addition, the server node 202 and microservice 204 are examples of the server nodes 108a-n and associated services 110a-n discussed above in connection with FIG. 1.

Figure 2:
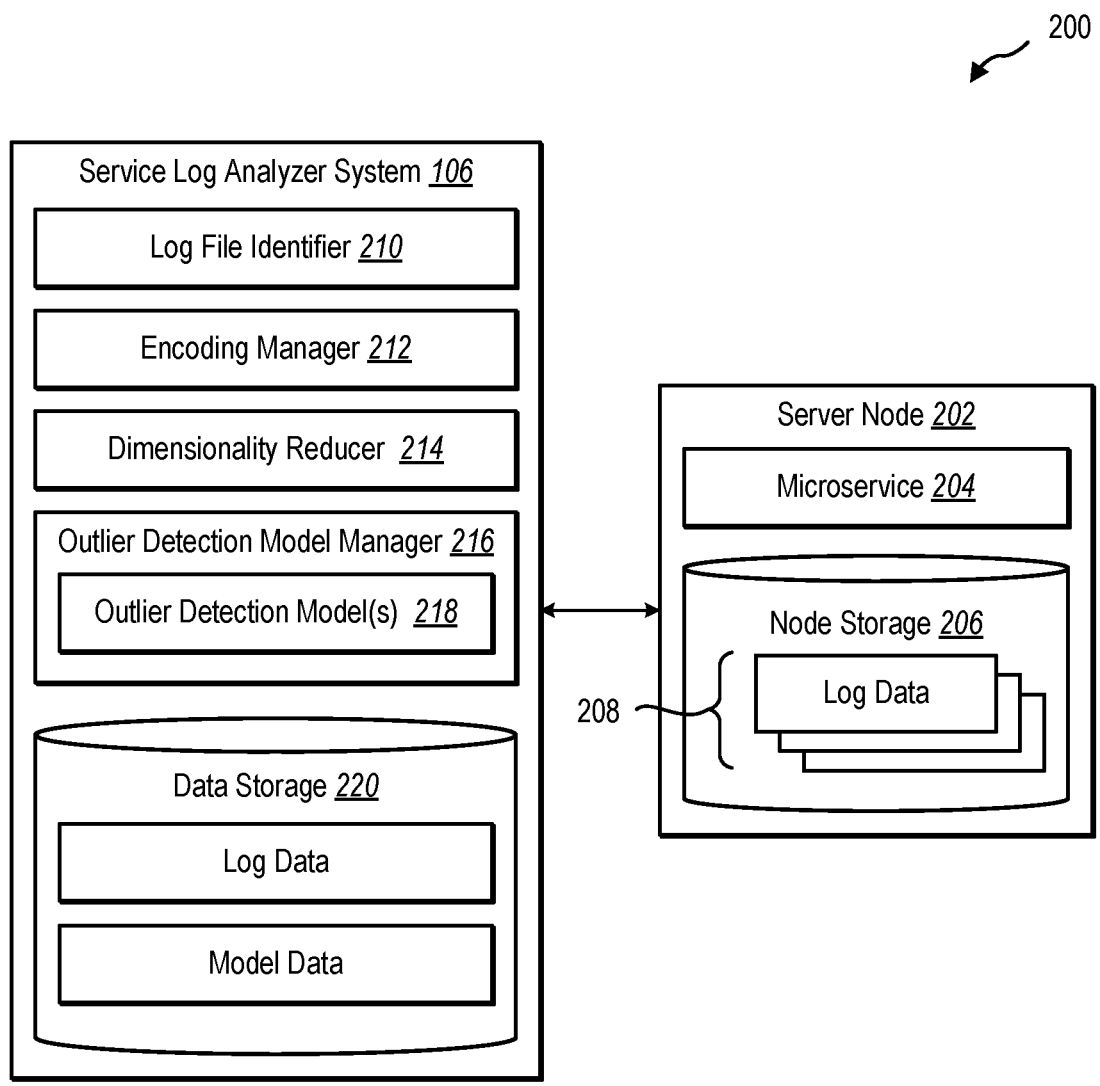

As shown in FIG. 2, the server node 202 includes a node storage 206 including log files 208 generated by and/or based on performance of the microservice 204. As noted above, in one or more embodiments, the log files 208 are generated by an agent implemented on the server node 202 or as a feature of the microservice 204. In one or more embodiments, the log files 208 are generated or maintained by an operating system (OS) of the server node 202 and/or OS of the service or virtual machine on which the microservice 204 is implemented. As noted above, the log files 208 include a record of any number of events that are observed in connection with operation by the microservice 204. In one or more embodiments, the log files 208 include logs of events over discrete periods of time or over a threshold number of observed events.

As shown in FIG. 2, the service log analyzer system 106 includes a number of components to perform various features and functionalities described herein. For example, as shown in FIG. 2, the service log analyzer system 106 includes a log file identifier 210, an encoding manager 212, a dimensionality reducer 214, and an outlier detection model manager 216 that can generate and implement an outlier detection model(s) 218. Each of these components 210-218 may cooperatively analyze and determine outliers within a given log file and determine, based on the outliers, whether the microservice is operating as designed.

Each of the components 210-218 of the service log analyzer system 106 may be in communication with each other using any suitable communication technologies. In addition, while the components 210-218 of the service log analyzer system 106 are shown to be separate in FIG. 2, any of the components or subcomponents may be combined into fewer components, such as into a single component, or divided into more components as may serve a particular implementation. As an illustrative example, in one or more embodiments, an outlier detection model 218 is provided to a server node 202 and applied to one or more of the log files 208 locally. As another example, features of one or more of the components 210-218 may be implemented across multiple cloud computing devices, such as a first server node tasked with training an outlier detection model based on a training log file and a second server node tasked with implementing the outlier detection model on new or additional log files associated with the microservice 204.

The components 210-218 of the service log analyzer system 106 may include hardware, software, or both. For example, in one or more embodiments, the components 210-218 of the service log analyzer system 106 shown in FIG. 2 include one or more instructions stored on a computer-readable storage medium and executable by processors of one or more computing devices. When executed by the one or more processors, the computer-executable instructions of the one or more computing devices (e.g., server device(s) 104) can perform one or more methods described herein. Alternatively, the components 210-218 of the service log analyzer system 106 may include hardware, such as a special purpose processing device to perform certain functions or groups of functions. Additionally, or alternatively, the components 210-218 of the service log analyzer system 106 can include a combination of computer-executable instructions and hardware.

Additional detail will now be given in connection with the individual components of the service log analyzer system 106 shown in FIG. 2. For example, as just mentioned above, an example of the service log analyzer system 106 includes a log file identifier 210. In one or more embodiments, the log file identifier 210 identifies one or more log files to be used in training an outlier detection model or, alternatively, applying the outlier detection model for the purpose of diagnosing how the microservice 204 is functioning or otherwise performing.

In connection with training the outlier detection model, the log file identifier 210 identifies a log file (e.g., from the log files 208) associated with a period of time when the microservice 204 was operating normally (e.g., with minimal or no service interruption). In one or more embodiments, the log file identifier 210 identifies a log file based on an indication from an administrator, user, or other individual indicating that the microservice 204 operated as designed over the period of time associated with the log file. In connection with implementing a previously trained outlier detection model, the log file identifier 210 may identify any one of the log files 208 to analyze in determining or diagnosing performance of the microservice 204 of a period of time associated with the respective log files 208. These identified log files are provided as inputs to models described herein in analyzing log files associated with unknown periods of performance by the microservice 204.

As mentioned above, and as further shown in FIG. 2, the service log analyzer system 106 includes an encoding manager 212. In one or more embodiments, the encoding manager 212 receives as input a log file and output a numerical representation of the log file. The encoding manager 212 may use a wide variety of encoding techniques to convert values having a combination of alphabetic and numeric values from the log file(s) to numeric representations of the data included therein. The encoding manager 212 is applied to log files used for training purposes in a similar manner as when generating numerical representations for analysis purposes.

In one or more embodiments, the encoding manager 212 generates a numerical representation of the log file by generating a matrix including the numerical representation of the log file(s). In one or more implementations, the matrix has a dimensionality corresponding to the dimensions of the log file from which it is generated. For example, the matrix may have a number of rows and columns corresponding to a number of rows and columns of the corresponding log file. In one or more embodiments, the matrix has a similar ratio of rows and columns or, in some instances, have an equal number of rows and columns as the associated log file.

As mentioned above, and as further shown in FIG. 2, the service log analyzer system 106 includes a dimensionality reducer 214. After encoding the log file, the dimensionality reducer 214 may apply an autoencoder or other dimension reducing mechanism to the encoded matrix in order to generate a multi-dimensional representation of the log file that has a lower dimensionality than the encoded matrix and/or the log file. Indeed, the resulting multi-dimensional representation of the log file may be reduced to a two-dimensional (2D) or three-dimensional (3D) representation of the log file such that the log file is plotted or mapped to a 2D and/or 3D dimensional space. Other dimensionalities may also be used.

As noted above, the dimensionality reducer 214 reduces a dimensionality of the encoded matrix using one or more of a variety of dimension reducing techniques. In one or more embodiments, the generates the multi-dimensional representation by applying a principal component analysis (PCA) engine to the matrix in which the dimensionality is reduced to a target dimensionality (e.g., 2-dimensions, 3-dimensions, or any target dimensionality lower than a dimensionality of the encoded matrix) while minimizing information loss.

In one or more embodiments described herein, the encoding manager 212 and the dimensionality reducer 214 are referred to collectively as an encoding model that is configured to receive a log file and generate a multi-dimensional representation of the log file. As discussed above, in one or more embodiments, generating the multi-dimensional representation includes a multi-stage process of encoding the log file to generate a matrix representation of the log file and then applying a PCA engine or other dimensionality reducing mechanism to generate a multi-dimensional representation of the log file.

In one or more embodiments, and as will be discussed in further detail below, the multi-dimensional outputs a multi-dimensional representation including a plurality of points representative of individual lines of the log file within or otherwise mapped to a multi-dimensional space. While one or more embodiments described herein refer specifically to a two-dimensional space, other dimensionalities may be used in representing the multi-dimensional representation of the log file. Indeed, in one or more embodiments, the multi-dimensional representation simply includes fewer dimensions than a number of columns of the log file.

As will be discussed in further detail below in connection with FIGS. 3 and 4, the process of identifying a log file and generating the multi-dimensional representation is applicable to both the training phase and implementation phase of an outlier detection model. For example, in one or more embodiments, the service log analyzer system 106 performs the acts of identifying a log file known to correspond to normal operation of the microservice 204 over a period of time as well as applying the encoding model to the log file to generate a multi-dimensional representation of the log file to use in training an outlier detection model. Similarly, in one or more embodiments, the service log analyzer system 106 performs the acts of identifying a log file that is not necessarily known to correspond to normal operation of the microservice 204 over a different period of time as well as applying the encoding model to the log file to generate a multi-dimensional representation of the log file to compare against a steady state model.

As mentioned above, and as shown in FIG. 2, the service log analyzer system 106 includes an outlier detection model manager 216. As further shown in FIG. 2, the outlier detection model manager 216 includes one or more outlier detection model(s) 218. As noted above, the outlier detection model manager 216 trains the outlier detection model(s) 218 based on input data that has been indicated as corresponding to normal operation of a microservice 204 as well as manage implementation of the outlier detection model(s) 218 in determining whether the microservice 204 is operating as designed with respect to a different log file.

In training the outlier detection model(s) 218, the outlier detection model manager 216 may receive a multi-dimensional representation of the log file known to correspond to normal operation of the microservice 204 and generate the outlier detection model 218 (e.g., a steady state model) including a histogram of datapoints known to correspond to normal operation of the microservice 204. In one or more embodiments, the outlier detection model 218 is a comprehensive histogram that can be compared to a similarly generated histogram of a similar dimensionality and corresponding to a log file of the microservice 204 that is not necessarily known to be associated with normal operation. As an illustrative example, the histogram of datapoints associated with lines of the steady state log file may be used to determine a region within a multi-dimensional space where points generated from lines of an input log file are predicted to be associated with normal operation if they fall within the region. Conversely, points generated from lines of the input log file would be predicted to be associated with non-normal operation if they fall outside the region. In the example where the model includes a multi-dimensional histogram of data associated with a log file known to correspond to normal operation, the outlier detection model 218 receives an input multi-dimensional histogram that is not necessarily known to correspond to normal operation and determines which points of the input multi-dimensional histogram are outliers from the steady state histogram model.

In one or more embodiments, the outlier detection model 218 is a machine learning model or other algorithm (or series of algorithms) that is trained to receive an input of a multi-dimensional representation of a log file and determine whether portions (e.g., lines) of the log file correspond to outlier (e.g., non-normal) behavior. In this example, the machine learning model may learn, based on observed normal behavior (e.g., as represented within one or more multi-dimensional representations of log files indicated as corresponding to normal behavior), whether lines of a given log file are normal or non-normal behavior for the microservice 204.

As noted above, in one or more embodiments, the outlier detection model(s) 218 is generated and applied to log files 208 associated with a specific microservice 204. It will be appreciated that while the training process associated with generating and/or training the outlier detection model(s) 218 is domain-neutral, a trained outlier detection model 218 may be limited to predicting normal operation for a microservice 204 from which the log file used to train the outlier detection model 218 was obtained. In one or more embodiments, the outlier detection model 218 is used in analyzing and predicting normal operation for other microservices of a similar type (e.g., different services of the same service family or having the same configurations associated with similar types of behavior). In contrast, different outlier detection models would be generated and/or trained for different microservices for use in analyzing and predicting normal performance for the different microservices.

As further shown in FIG. 2, the service log analyzer system 106 includes a data storage 220 including a variety of data thereon accessible to the components 210-218 of the service log analyzer system 106. As shown in FIG. 2, the data storage 220 includes log data, which may include any data contained in the log files 208 for the microservice 204. The log data may additionally include indications of whether the log data is associated with normal performance of the microservice 204.

As further shown, the data storage 220 includes model data. The model data may include any information associated with models used in generating the multi-dimensional representations of the log files. In addition, the model data may include information from the outlier detection model(s) 218 used in determining whether a given log file is associated with normal performance of the microservice 204. The model data may include algorithms, steady state information, and various parameters relied on for determining whether specific portions or data points of a multi-dimensional representation of a log file are associated with normal performance of the microservice 204.

Additional detail will now be discussed in connection with the different stages of training and implementing the outlier detection model(s) 218. For example, FIG. 3 illustrates an example workflow 300 associated with generating a multi-dimensional representation of a log file that is indicated as associated with normal performance of a microservice and training an outlier detection model to predict whether a given input log file is associated with normal performance of the microservice. In contrast, FIG. 4 illustrates an example workflow 400 associated with generating a multi-dimensional representation of a log file that is not necessarily associated with normal performance of a microservice and on which an outlier detection model may be applied to determine which lines or portions of the log file are predicted to correspond to non-normal (e.g., outlier) behavior of the microservice. Additional information in connection with each of these workflows will be discussed below.

Figure 3:
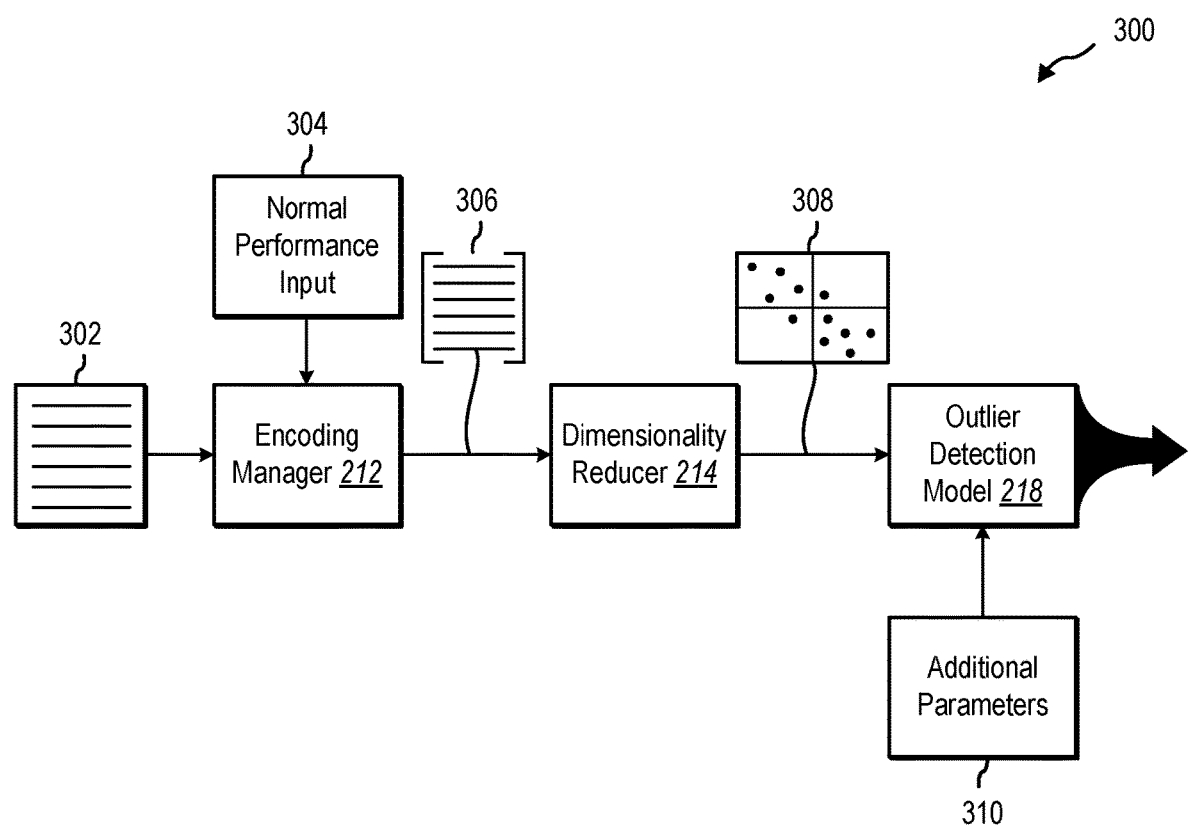

For example, as shown in FIG. 3, the service log analyzer system 106 implements a workflow 300 for generating a multi-dimensional representation of a log file associated with normal performance by a microservice and training an outlier detection model based on the information contained therein. For example, as shown in FIG. 3, the service log analyzer system 106 (e.g., the encoding manager 212 on the service log analyzer system 106) receives a steady state log file 302. As noted above, in one or more embodiments, the steady state log file 302 includes performance data indicating performance metrics by a microservice over a period of time associated with normal performance by the microservice. This normal state of behavior may be assumed or explicitly indicated.

For example, as shown in FIG. 3, the encoding manager 212 receives a normal performance input 304 indicating that the log file 302 is associated with normal performance by the microservice. As noted above, this normal performance input 304 may be the only supervision input relied on in training the outlier detection model 218 with remaining acts of training and implementing the model(s) being done automatically. In one or more embodiments, the normal performance input 304 is simply a user input from an administrator, client, or domain expert associated with the respective service. In one or more embodiments, the normal performance input 304 could be an automated input or output of an algorithm indicating that the microservice has experienced a minimum threshold number of interruptions over a duration of time associated with the steady state log file 302.

As shown in FIG. 3, the encoding manager 212 generates a multi-dimensional representation 306 of the steady state log file 302. As indicated above, in one or more embodiments, this multi-dimensional representation 306 refers to a matrix representation of the steady state log file 302. In one or more embodiments, the multi-dimensional representation 306 has a similar number of dimensions as the steady state log file 302. For example, in one or more implementations, the multi-dimensional representation 306 includes a similar number of rows and columns as the steady state log file 302. This similar number of rows and columns may refer to a similar ratio of rows and columns or, in some instances, a similar (e.g., identical or within a minimum threshold) number of rows and/or columns as the steady state log file 302. In one or more embodiments described herein, this process of generating the multi-dimensional representation refers to encoding the log file to be a matrix representation of the log file.

In one or more embodiments, the multi-dimensional representation 306 is provided as input to a dimensionality reducer 214. The dimensionality reducer 214 may apply one or more transformations on the multi-dimensional representation 306 to generate a reduced dimensionality representation 308 of the steady state log file 302. The dimensionality reducer 214 reduces dimensionality of the multi-dimensional representation 306 of the steady state log file 302 in a number of ways. In one or more embodiments, the dimensionality reducer 214 is implemented as an autoencoder that reduces dimensionality of the matrix using a principal component analysis (PCA) engine.

In one or more embodiments, the dimensionality reducer 214 reduces the dimensionality of the multi-dimensional representation 306 to have any number of reduced dimensions. In one or more embodiments, the dimensionality reducer 214 generates a two-dimensional representation of the steady state log file 302. In one or more embodiments, the dimensionality reducer 214 generates a three-dimensional representation of the steady state log file 302. Indeed, the dimensionality reducer 214 may generate any reduced dimensionality representation 308 in which the dimensionality of the representation is less than a dimensionality of the multi-dimensional representation output by the encoding manager 212 in which the dimensions correspond to the dimensionality of the steady state log file 302.

As noted above, the process of generating the multi-dimensional representation 306 and the reduced dimensionality representation 308 may be collectively referred to as generating a multi-dimensional representation of the log file. For example, while applying an encoding model to the steady state log file 302 may be done as a single act of generating a multi-dimensional representation that has a lower dimensionality than the dimensionality of the steady state log file 302, this process may also include multiple stages, as shown in the example illustrated in FIG. 3. For example, applying the encoding model to a steady state log file 302 may include first encoding the log file to generate the multi-dimensional representation 306 having the similar dimensionality as the log file and, second, reducing the dimensionality of the multi-dimensional representation 306 to generate the reduced dimensionality representation 308 shown in FIG. 3.

In the example shown in FIG. 3, the dimensionality reducer 214 outputs a reduced dimensionality representation 308 including a number of datapoints plotted on an n-dimensional space in which the n-dimensions corresponds to the reduced dimensionality of the reduced dimensionality representation 308. In this example, the n-dimensional space is a two-dimensional space showing datapoints plotted along an x-axis and a y-axis. Each of these points represent a corresponding portion of the steady state log file 302. For example, in one or more embodiments, each of the points correspond to an associated line of the steady state log file 302. In one or more embodiments, the reduced dimensionality representation 308 includes a number of data points corresponding to (e.g., equal to) a number of lines from the steady state log file 302.

As shown in FIG. 3, the reduced dimensionality representation 308 is provided as an input to train an outlier detection model 218 to determine whether lines of a given log file are outliers from normal performance of the microservice. It will be appreciated that the outlier detection model 218 is trained with respect to log files originating from the same microservice (or similar type of microservice having a same configuration) as the steady state log file 302.

In one or more embodiments, the outlier detection model 218 receives various additional parameters 310 that are used to further train or refine an algorithm used by the outlier detection model 218. For example, the additional parameters 310 may refer to metrics of tolerance or variation from the data points of the reduced dimensionality representation 308 that the outlier detection model 218 is willing to tolerate in determining whether to consider a given line or subset of lines from an input log file as outliers from normal performance of the microservice. In one or more embodiments, the additional parameters 310 refer to noise reduction factors or other instructions that the outlier detection model 218 considers in evaluating log lines and determining scores associated with likelihood that the associated log line(s) are outliers.

In one or more embodiments, the outlier detection model 218 refers to a simple histogram representation of the reduced dimensionality representation 308 to be compared against a similarly generated histogram representative of a different log file. In this example the comparison may simply be a comparison of distance (or value being a function of distance) within the n-dimensional space between datapoints of a new log file and a range of datapoints of the steady state log file. As an example, in one or more embodiments, the service log analyzer system 106 generates the outlier detection model 218 by performing an analysis on the distribution of datapoints from the reduced dimensionality representation 308 to determine a range (e.g., a geographic range) or otherwise defined area of datapoints within the n-dimensional space that fall within normal operation for the microservice(s).

Alternatively, in one or more embodiments, the outlier detection model 218 refers to an algorithm or model (e.g., a machine learning model) that is trained or otherwise configured to determine whether a given line of a log file is similar to or falls within the representation of the steady state log file 302 from the reduced dimensionality representation 308. In this example, the outlier detection model 218 is trained to learn what normal performance of the microservice entails based on a location of the datapoints within the reduced dimensionality representation 308 of the steady state log file 302. It will be appreciated that examples of the outlier detection model 218 refer to a variety of machine learning models or algorithms that are capable of analyzing datapoints within an n-dimensional space similar to the n-dimensional space of the reduced dimensionality representation 308 of the steady state log file 302.

Additional information will now be discussed in connection with an example workflow 400 in which content of an input log file is analyzed to determine whether portions of the input log file are associated with non-normal operation of a corresponding microservice. It will be noted that the workflow 400 includes many of the same or similar acts shown and discussed above in connection with FIG. 3. Indeed, this workflow 400 showing an implementation phase of the outlier detection model 218 may include many of the same components performing similar acts as discussed above in connection with the training phase as discussed above.

Figure 4:
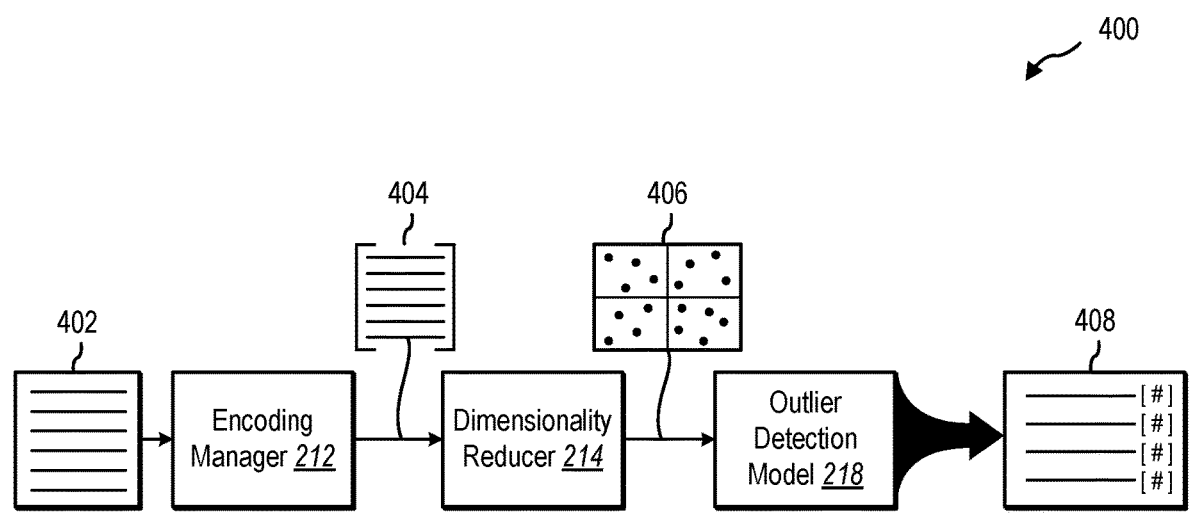

As shown in FIG. 4, a service log analyzer system 106 receives an input log file 402. In contrast to the steady state log file 302, the input log file 402 may include telemetry and other performance data for the microservice during a period of time for which a normal or non-normal state of performance of the associated microservice is unknown. It will also be noted that while the input log file 402 may be associated with a different duration of time than the steady state log file 302, respective log files 302, 402 may originate from the same microservice. In the least, the respective log files 302, 402 would originate from similar microservices that have very similar or identical configurations associated with similar expected patterns of operation and performance.

As shown in FIG. 4, the input log file 402 is provided to or otherwise obtained by the encoding manager 212. Similar to the process described above, the encoding manager 212 may generate a multi-dimensional representation 404 of the input log file 302. In one or more embodiments, this involves generating a matrix with columns and rows corresponding to columns and rows of the input log file 302.

As further shown in FIG. 4, the encoding manager 212 provides the multi-dimensional representation of the input log file 402 as an input to the dimension reducer 214. The dimension reducer 214 may generate a reduced dimensionality representation 406 of the log file 402 in which a dimensionality of the multi-dimensional representation 404 of the log file 402 has been reduced to a target-reduced dimensionality. In the example shown in FIG. 4, the dimension reducer 214 generates a two-dimensional representation of the log file 402. Other dimensionalities may be used (e.g., three-dimensional or higher). It will be understood that the dimensionality of the reduced dimensionality representation 406 for the input log file 402 will be a similar dimensionality as the dimensionality of the reduced dimensionality representation 308 of the steady state log file 302.

Upon generating the reduced dimensionality representation 406 of the input log file 402, the dimension reducer 214 may provide the reduced dimensionality representation 406 as an input to the outlier detection model 218. In this example, the outlier detection model 218 refers to a trained outlier detection model based on the inputs and assumption of normal operations of the reduced dimensionality representation 308 of the steady state log file 302. As noted above, in one or more embodiments, the outlier detection model 218 determines whether the data included within the input log file 402 (e.g., as contained within the reduced dimensionality representation 406 of the input log file 402) is indicative of normal operation of a corresponding microservice.

In one or more embodiments, the outlier detection model 218 generates an output indicating outlier data corresponding to non-normal behavior. In one or more embodiments, the outlier detection model 218 generates an output 408 including an identification of any number of lines from the input log file 402 that is predicted to represent non-normal operation of the microservice. In one or more embodiments, the outlier detection model 218 provides an indication that the input log file 402 has errors and flag the log file 402 for further inspection. Alternatively, in one or more embodiments, the outlier detection model 218 provides an indication for one or more specific lines or groupings of lines within the log file 402 that should be looked at more closely as being associated with a prediction of non-normal operation by the microservice.

As indicated above, each of the datapoints represented in the reduced dimensionality representation 406 of the input log file 402 may be associated with a corresponding line within the input log file 402. Thus, in one or more embodiments, the outlier detection model 218 generates an output for each of the datapoints represented within the reduced dimensionality representation 406 indicating a score that provides a likelihood or probability that behavior represented within the respective log line is associated with non-normal or normal operation of the microservice.

The output 408 of the outlier detection model 218 may include additional information. For example, in one or more embodiments, the outlier detection model 218 provides an output 408 similar to the one shown in FIG. 4 in which every line of the log file is tagged with a score. As noted above, in one or more implementations, the scores provide an indication of whether a datapoint associated with the corresponding line of the input log file 402 is an outlier and therefore associated with non-normal operation of the microservice.

In addition to generally providing the listing of scores for the respective lines of the input log file 402, the outlier detection model 218 may provide an indication of which of the lines are predicted to be associated with non-normal behavior. For example, in one or more embodiments, the outlier detection model 218 compares the determined scores against an outlier threshold to determine a subset of the lines (or groupings of lines) having scores that exceed the outlier threshold. Based on this comparison, the outlier detection model 218 can selectively identify lines from the input log file 402 associated with predicted non-normal behavior.

Figure 5:
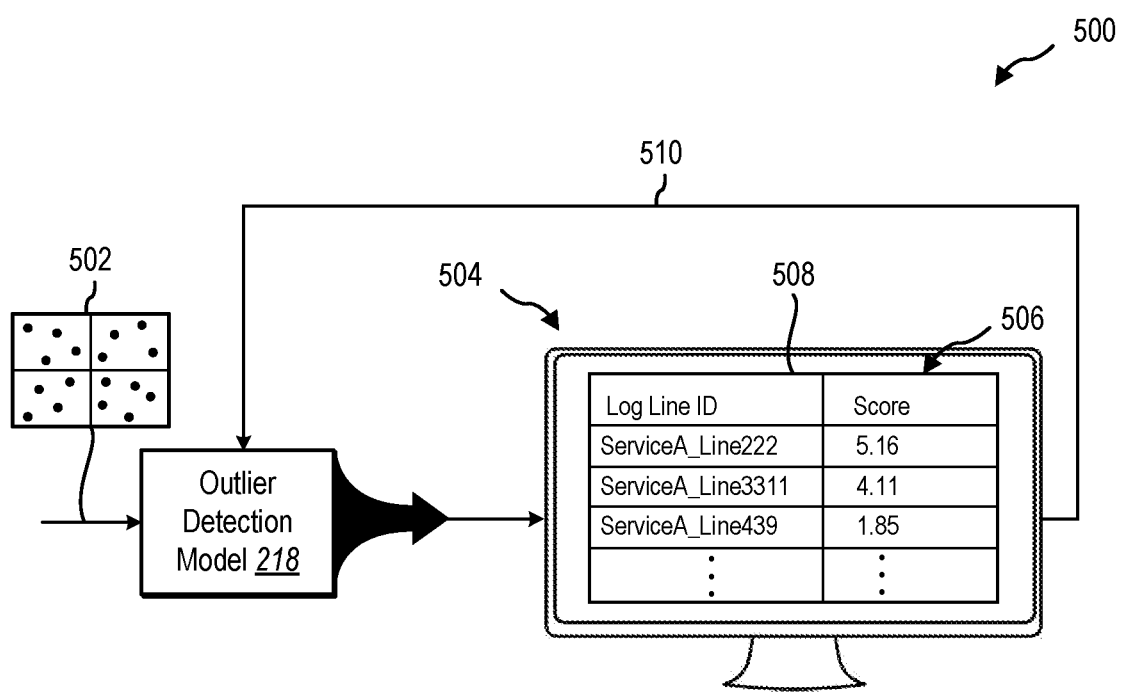

FIG. 5 illustrates another implementation in which the outlier detection model 218 generates an output in accordance with one or more embodiments. In particular, FIG. 5 illustrates an example workflow 500 in which the outlier detection model 218 receives a reduced dimensionality representation 502 of an input log file to consider in determining data points of the reduced dimensionality representation 502 that fall outside of a predicted range of operation for a corresponding microservice. The reduced dimensionality representation 502 may be generated and include similar features as discussed above in connection with the reduced dimensionality representations 308, 406 representative of associated log files.

Upon receiving the reduced dimensionality representation 502, in one or more embodiments, the outlier detection model 218 determines scores for each of the datapoints represented in the reduced dimensionality representation 502. In one or more implementations, the scores are indicative of a probability or likelihood that tracked behavior of the microservice represented within a corresponding log line is predicted to fall outside a normal range of operation. As indicated above, the outlier detection model 218 may determine a score for each data point of the reduced dimensionality representation 502 to determine a score for each line of the corresponding log file.

As shown in FIG. 5, the outlier detection model 218 generates an output including score data and provides the output to a computing device 504 having a graphical user interface 506 on which a presentation of the output from the outlier detection model 218 can be displayed. The computing device 504 may refer to any of a variety of computing devices capable of displaying results of the output of the outlier detection model 218. In this example, the computing device 504 refers to a device of an administrator, developer, or other entity responsible for maintaining operation of a microservice for which the log file is being analyzed.

In one or more embodiments, the outlier detection model 218 determines a score for each line of a corresponding log file. In one or more embodiments, the outlier detection model 218 provides a listing of the scores associated with each of the lines. Alternatively, in one or more embodiments, the outlier detection model 218 provides an indication of those lines that fall outside a predetermined outlier threshold associated with a threshold likelihood or probability that a given log line is associated with non-normal behavior by the microservice.

In the example shown in FIG. 5, the outlier detection model 218 provides a subset of scores associated with those log lines whose data is associated with a score that exceeds a minimum threshold. Thus, a user of the computing device 504 may receive a targeted subset of log lines to review in further detail to identify potential issues with the microservice.

As further shown in FIG. 5, the outlier detection model 218 provides the selection of log lines in order of the respective scores. In the example shown in FIG. 5, the computing device 504 provides a presentation of a score table 508 including a ranking of scores in which the highest ranked lines are associated with a higher probability that the microservice performed in a way that was unexpected. In one or more embodiments, the outlier detection model 218 provides the top-10 or top-5 (or other predetermined threshold) of scores and associated indicators of log lines within the score table 508.

As shown in FIG. 5, the display of the output from the outlier detection model 218 includes an indication of the log lines and associated service as well as the score determined by the outlier detection model 218 for the corresponding lines. Other implementations may include further information. For example, in one or more embodiments, the outlier detection model 218 provides an indication of a particular action that caused the erroneous activity. In one or more embodiments, the outlier detection model 218 provides an indication of a range of lines that may be collectively associated with non-normal behavior (e.g., rather than providing an indication of individual lines). In one or more embodiments, the presentation of the output of the outlier detection model 218 includes links to the source so that someone reviewing the potential errors can pull up the log file and further analyze the individual line and surrounding lines associated with behavior of the microservice at or around the same time period.

In one or more embodiments, the presentation of scores includes scores as received from one or more outlier detection models associated with the same or different services. For example, in one or more embodiments, the outlier detection model 218 is used to analyze and determine scores for any number of log files of a microservice and generate multiple outputs including scores for multiple log files. The resulting presentation on the computing device 504 may therefore show results of analysis of different log files over different periods of time.

As another example, where the outlier detection model 218 is trained based on one or more steady state log files across one or more services of the same or similar types, the outlier detection model 218 provides outputs associated with different services (of similar or identical types) to provide a set of scores for a developer, administrator, or other individual to analyze with respect to a collection of services generally. In this example, the scores may be received by a single outlier detection model 218 trained on log files for multiple services of a same type or by different outlier detection models that are each individually trained for each of multiple services (e.g., of the same or different types).

As shown in FIG. 5, in one or more embodiments, the computing device 504 receives an indication from a user as to whether a score is accurate or not. For example, in one or more embodiments, a user of the computing device 504 reviews a log file and determine that a score indicative of a predicted non-normal operation of the microservice should have been considerably lower or that the specific behavior should be considered within the normal range of operation of the service. In this example, the outlier detection model 218 receives feedback data 510 indicating whether one or more scores are correct or incorrect. The outlier detection model 218 may utilize the feedback data 510 to further refine the models (e.g., the histogram, the machine learning model, one or more algorithms) relied on in determining the scores for the log files.

Figure 6:
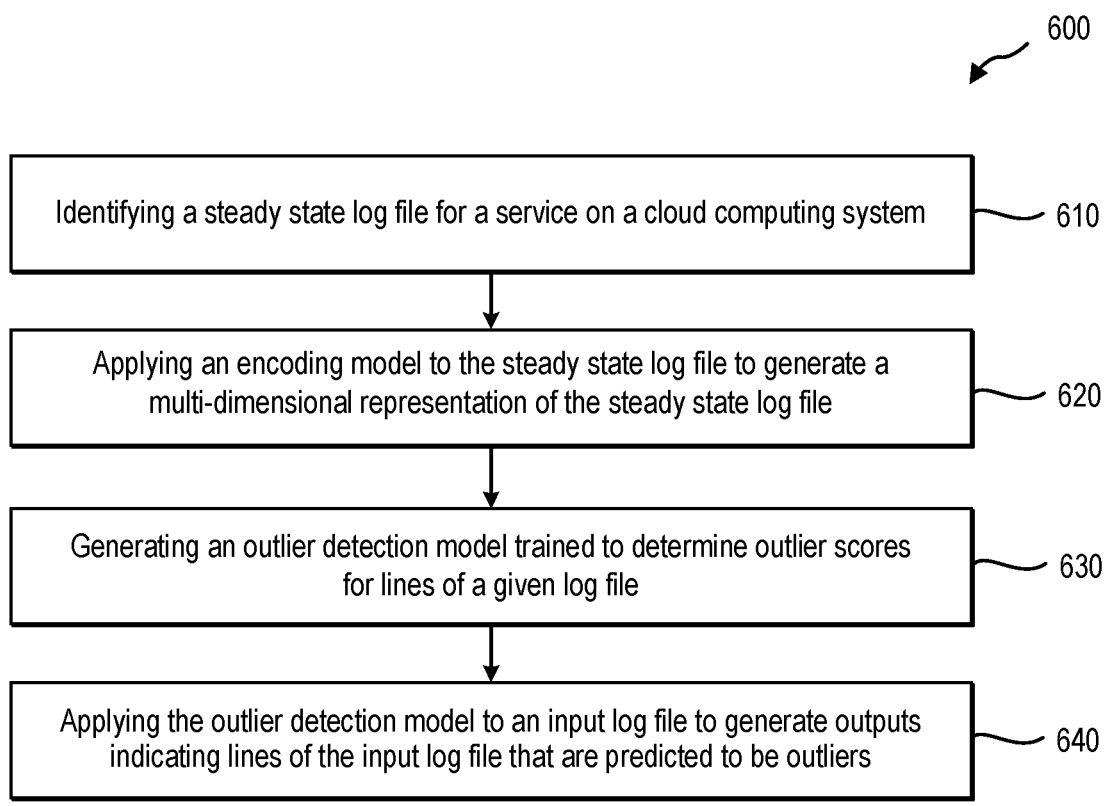

Turning now to FIG. 6, this figure illustrates example flowcharts including series of acts for training an outlier detection model and implementing the outlier detection model to determine lines from a log file generated by a service that are associated with performance by the service that is considered non-normal or otherwise undesirable by the service(s). While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

FIG. 6 illustrates a series of acts 600 related to training an outlier detection model and implementing the outlier detection model to determine whether portions (e.g., lines) of a log file of a service are associated with non-normal or undesirable activity by the service. As shown in FIG. 6, the series of acts 600 includes an act 610 of identifying a steady state log file for a service on a cloud computing system. In one or more embodiments, the act 610 involves identifying a steady state log file for a service on a cloud computing system associated with normal operation of the service over a period of time.

As further shown in FIG. 6, the series of acts 600 includes an act 620 of applying an encoding model to the log file to generate a multi-dimensional representation of the log file. In one or more embodiments, the act 620 involves applying an encoding model to the steady state log file to generate a multi-dimensional representation of the steady state log file, the multi-dimensional representation including a plurality of points representative of lines of the steady state log file within a multi-dimensional space.

As further shown in FIG. 6, the series of acts 600 includes an act 630 of generating an outlier detection model trained to determine outlier scores for lines of an input log file. In one or more embodiments, the act 630 involves generating an outlier detection model trained to determine a plurality of outlier scores for a plurality of lines of a log file based on the multi-dimensional representation of the steady state log file being associated with normal operation of the service, wherein an outlier score indicates a predicted probability that a given line from the plurality of lines of the log file is an outlier from normal operation of the service.

As further shown in FIG. 6, the series of acts 600 includes an act 640 of applying the outlier detection model to an input log file to generate outputs indicating lines of the input log file that are predicted to be outliers. In one or more embodiments, the act 640 involves applying the outlier detection model to an input log file to generate outputs indicating lines of the input log file that are predicted to be outliers associated with non-normal operation of the service.

In one or more embodiments, applying the encoding model includes one or more acts. For example, applying the encoding model to the log file may include encoding the steady state log file to be a matrix representation of the steady state log file, the matrix representation having a same dimensionality as the steady state log file. Applying the encoding model to the log file may further include applying an autoencoder to the matrix representation of the log file to reduce a dimensionality of the matrix representation to a target dimensionality of the multi-dimensional representation. In one or more embodiments, the autoencoder reduces dimensionality of the matrix representation using a principal component analysis (PCA) engine.

In one or more embodiments, the multi-dimensional representation includes fewer dimensions than a number of columns of the log file. In one or more embodiments, the multi-dimensional representation of the log file is a two-dimensional representation of the log file.

In one or more embodiments, generating the outlier detection model includes training the outlier detection model based on the multi-dimensional representation of the log file. In one or more embodiments, the outlier detection model is a machine learning model trained to learn normal behavior of the service on the cloud computing system based on the multi-dimensional representation of the log file. In one or more embodiments, the outlier detection model includes defined region of the multi-dimensional space associated with normal operation of the service based on locations of the plurality of points from the multi-dimensional representation of the steady state log file within the multi-dimensional space.

In one or more embodiments, the input log file is a log file generated by the service over a second period of time with an unknown level of service. In one or more embodiments, the input log file is a log file generated by the same type of service as the service associated with the log file.

In one or more embodiments, the plurality of outputs includes a subset of lines from the input log file that are predicted to be outliers. In one or more embodiments, the plurality of outputs includes a set of rankings for a predetermined number of lines with highest scores associated with a high likelihood of associated lines from the input log file being outliers from normal operation of the service.

In one or more embodiments, the series of acts 600 includes an act of identifying a second steady state log file for a second service on the cloud computing system associated with normal operation of the second service. In one or more embodiments, the series of acts 600 includes applying the encoding model to the second steady state log file to generate a second multi-dimensional representation of the second log file, the second multi-dimensional representation including a second plurality of points representative of lines of the second steady state log file within a second multi-dimensional space. In one or more embodiments, the series of acts 600 includes generating a second outlier detection model trained to determine outlier scores for a second plurality of lines of a second log file based on the second multi-dimensional representation of the second steady state log file being associated with normal operation of the second service. The series of acts 600 may further include applying the second outlier detection model to a second input log file to determine a second plurality of outputs associated with performance by the second service.

Figure 7:
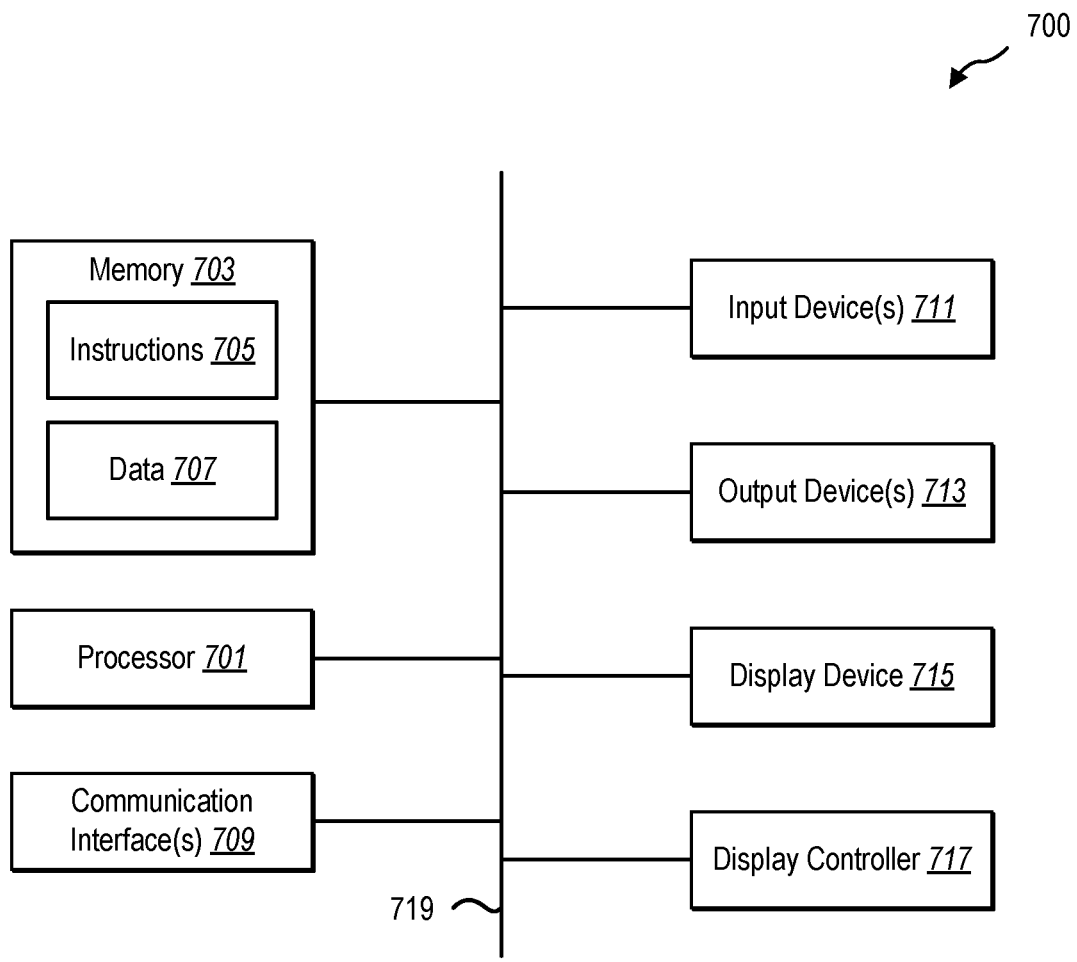

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used. In one or more embodiments, the computer system 700 further includes one or more graphics processing units (GPUs), which can provide processing services related to both entity classification and graph generation.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    identifying a steady state log file for a service on a cloud computing system associated with normal operation of the service over a period of time;
    applying an encoding model to the steady state log file to generate a multi-dimensional representation of the steady state log file, the multi-dimensional representation including a plurality of points representative of lines of the steady state log file within a multi-dimensional space;
    generating an outlier detection model trained to determine a plurality of outlier scores for a plurality of lines of a given log file based on the multi-dimensional representation of the steady state log file being associated with normal operation of the service, wherein an outlier score indicates a predicted probability that a given line from the plurality of lines of the given log file is an outlier from normal operation of the service; and
    applying the outlier detection model to an input log file to generate a plurality of outputs indicating lines of the input log file that are predicted to be outliers from normal operation of the service.

2. The method of claim 1, wherein applying the encoding model to the steady state log file further includes:
    encoding the steady state log file to be a matrix representation of the steady state log file, the matrix representation having a same dimensionality as the steady state log file; and
    applying an autoencoder to the matrix representation of the steady state log file to reduce a dimensionality of the matrix representation to a target dimensionality of the multi-dimensional representation.

3. The method of claim 2, wherein the autoencoder reduces dimensionality of the matrix representation using a principal component analysis (PCA) engine.

4. The method of claim 1, wherein the multi-dimensional representation includes fewer dimensions than a number of columns of the steady state log file.

5. The method of claim 1, wherein the multi-dimensional representation of the steady state log file is a two-dimensional representation of the steady state log file.

6. The method of claim 1, wherein the outlier detection model includes a defined region of the multi-dimensional space associated with normal operation of the service based on locations of the plurality of points from the multi-dimensional representation of the steady state log file within the multi-dimensional space.

7. The method of claim 1, wherein the outlier detection model is a machine learning model trained to determine whether the given file is associated with normal behavior of the service on the cloud computing system based on the multi-dimensional representation of the steady state log file.

8. The method of claim 1, wherein the input log file is generated by the service over a second period of time with an unknown level of service.

9. The method of claim 1, wherein the input log file is generated by a same type of service as the service associated with the steady state log file.

10. The method of claim 1, wherein the plurality of outputs includes a subset of lines from the input log file that are predicted to be outliers.

11. The method of claim 1, wherein the plurality of outputs includes a set of rankings for a predetermined number of lines with highest scores associated with a high likelihood of associated lines from the input log file being outliers from normal operation of the service.

12. The method of claim 1, further comprising:
identifying a second steady state log file for a second service on the cloud computing system associated with normal operation of the second service;
applying the encoding model to the second steady state log file to generate a second multi-dimensional representation of the second log file, the second multi-dimensional representation including a second plurality of points representative of lines of the second steady state log file within a second multi-dimensional space; and
generating a second outlier detection model trained to determine outlier scores for a second plurality of lines of a second log file based on the second multi-dimensional representation of the second steady state log file being associated with normal operation of the second service.

13. The method of claim 12, further comprising applying the second outlier detection model to a second input log file to determine a second plurality of outputs associated with performance by the second service.

14. A system, comprising:
at least one processor;
memory in electronic communication with the at least one processor; and
instructions stored in the memory, the instructions being executable by a computing device to:
identify a steady state log file for a service on a cloud computing system associated with normal operation of the service over a period of time;
apply an encoding model to the steady state log file to generate a multi-dimensional representation of the steady state log file, the multi-dimensional representation including a plurality of points representative of lines of the steady state log file within a multi-dimensional space;
generate an outlier detection model trained to determine a plurality of outlier scores for a plurality of lines of a given log file based on the multi-dimensional representation of the steady state log file being associated with normal operation of the service, wherein an outlier score indicates a predicted probability that a given line from the plurality of lines of the given log file is an outlier from normal operation of the service; and
apply the outlier detection model to an input log file to generate a plurality of outputs indicating lines of the input log file that are predicted to be outliers from normal operation of the service.

15. The system of claim 14, wherein applying the encoding model to the steady state log file further includes:
encoding the steady state log file to be a matrix representation of the steady state log file, the matrix representation having a same dimensionality as the steady state log file; and
applying an autoencoder to the matrix representation of the steady state log file to reduce a dimensionality of the matrix representation to a target dimensionality of the multi-dimensional representation.

16. The system of claim 14, wherein the multi-dimensional representation of the steady state log file is a two-dimensional representation of the steady state log file.

17. The system of claim 14, wherein the outlier detection model is a machine learning model trained to determine whether the given file is associated with normal behavior of the service on the cloud computing system based on the multi-dimensional representation of the steady state log file.

18. The system of claim 14, wherein the plurality of outputs includes a subset of lines from the input log file that are predicted to be outliers.

19. A non-transitory computer readable medium storing instructions thereon that, when executed by at least one processor, causes computing device to:
identify a steady state log file for a service on a cloud computing system associated with normal operation of the service over a period of time;
apply an encoding model to the steady state log file to generate a multi-dimensional representation of the steady state log file, the multi-dimensional representation including a plurality of points representative of lines of the steady state log file within a multi-dimensional space;
generate an outlier detection model trained to determine a plurality of outlier scores for a plurality of lines of a given log file based on the multi-dimensional representation of the steady state log file being associated with normal operation of the service, wherein an outlier score indicates a predicted probability that a given line from the plurality of lines of the given log file is an outlier from normal operation of the service; and
apply the outlier detection model to an input log file to generate a plurality of outputs indicating lines of the input log file that are predicted to be outliers from normal operation of the service.

20. The non-transitory computer readable medium of claim 19, wherein applying the encoding model to the steady state log file further includes:
encoding the steady state log file to be a matrix representation of the steady state log file, the matrix representation having a same dimensionality as the steady state log file; and
applying an autoencoder to the matrix representation of the steady state log file to reduce a dimensionality of the matrix representation to a target dimensionality of the multi-dimensional representation.

* * * * *